Patented Sept. 21, 1937

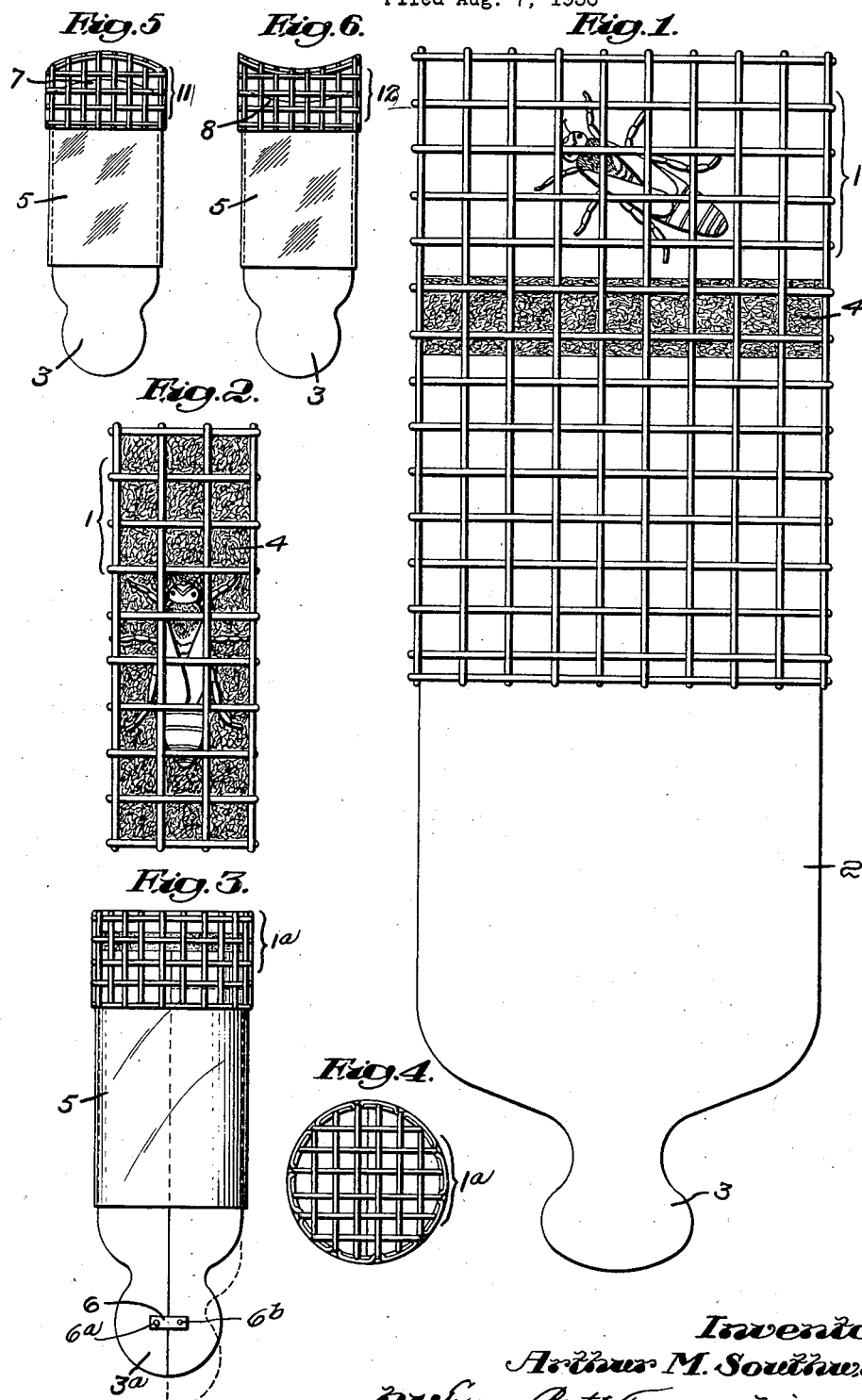

2,093,784

UNITED STATES PATENT OFFICE 2,093,784

CONTAINER FOR ISOLATING INSECTS

Arthur M. Southwick, Waban, Mass.

Application August 7, 1936, Serial No. 94,778

2 Claims. (Cl. 119—1)

This invention relates to containers or cages for insects, and other small animals, and aims particularly to provide a novel container for the purpose of temporarily segregating or isolating the insect or other small animal for any purpose.

In the drawing of four embodiments of my invention illustrated and described herein:—

Fig. 1 is a side elevation;

Fig. 2, an end elevation;

Fig. 3, a side elevation of a modified form of cage;

Fig. 4, an end view of the same;

Figs. 5 and 6 are modified forms of plunger heads and cage construction.

Referring first to Fig. 1, my novel container is shown as a preferably rectangular cage-like container 1, of any convenient material, as thin metal, celluloid, or other material, with perforated walls, or of wire, of suitable size, and with a mesh measurement sufficiently small to prevent the escape of the insect.

Within the container is a plunger 2, as of wood or other suitable material, and of a size to fit closely but operatively in the container, and adapted to be pushed in or withdrawn, as required. The plunger may have a handle 3, for convenience, on one end, while the opposite end is preferably provided with a soft pad 4 of some material, as cotton, felt or the like, to avoid injuring the insect.

When using the cage or container, one withdraws the plunger, and then at the right opportunity places the cage, open end down, over the insect, and as the insect crawls up on the inside wall of the cage, one temporarily places his finger over the open end, if necessary, until he can insert the plunger. If the insect does not crawl up on the container wall, a sheet of paper may be pushed beneath the open cage end, thus confining him in the cage.

One then gradually pushes the plunger inwardly, and gently crowds the insect toward the closed end of the cage. When the padded end of the plunger has forced the insect up against the end wall of the cage so far that he cannot easily travel far nor turn over or around, one can examine and study him, or deal with him in any way.

This cage is particularly useful to entomologists and others handling small animals, as toads, turtles, spiders and other insects, for the purpose of studying them, and especially to the owners of bees, who wish periodically to examine a bee, as for instance the queen bee. As it is desirable to replace the queen bee periodically, say every two or three years, it is convenient to adopt some means for marking her, which will indicate the year she was placed in the hive and her age, as, for instance, by placing a small dot of a certain color denoting a given year on her back or wings, to indicate the year she was placed in the hive, using a different color for each year, or other similar means. When there are a large number of hives, this is quite an important matter.

Sometimes the bee is marked, as by clipping her wing or wings, and this can readily be done through the cage wall by proper implements, when the bee is confined as above described.

If handled with care, the insect will not be injured, and can easily be liberated.

My cage may be of any shape, as rectangular, cylindrical, Fig. 3, or other shape, but I have found the rectangular one generally most convenient. However, in some instances, the cylindrical shape is convenient and preferable, as when one wishes to examine an insect, as a spider, or small animal, as a turtle, either of which is not always long and slender.

It is sometimes desirable to have the plunger head 8 concave, Fig. 6, or convex, 7, Fig. 5, and the cage head similarly formed, as 11 and 12, respectively, to better fit over the insect or animal and hold it, and perhaps with no pad upon the plunger head, as not needed.

In some cases, it may be preferred to make the greater part of the cage of transparent, or even opaque material, 5, Fig. 3, except the closed end, as that portion usually provides the necessary opportunity for observing and dealing with the insect.

In Fig. 3, I have also shown a multi-part plunger, which is sometimes convenient. For instance, if the isolated insect will not remain quiet, the space in which it is isolated may be at once cut down by fifty per cent. by pushing in one-half of the plunger, normally locked to the other half, by any latch 6, and thus limiting its available space. The latch may be of any suitable convenient type, as for instance a flexible metal strip 6, pivoted at 6a to one-half of the plunger, and drilled at its opposite end to receive a pin 6b on the other half of the plunger, the strip being flexible to enable it to be released from the pin by simply raising it therefrom.

My invention is not limited to the precise construction shown herein, but may be modified in many details, without departing from the spirit of the claims, and within the scope thereof.

I claim:

1. An isolating cage for insects and other small animals comprising side walls and a perforated end wall, and a plunger with a padded inner end slidable in one end of the cage to close it and confine the animal in a limited space where the animal can be studied and dealt with.

2. An isolating cage for insects and other small animals comprising side and end walls, and a multi-part plunger with padded inner end slidable therein to close the cage and confine the insect in a limited space for observation, one plunger part being adjustable longitudinally and relatively to the other part, the adjustable plunger part acting, when pushed in to the end of the cage while the other plunger part is left partly withdrawn, to still further reduce the space for the insect.

ARTHUR M. SOUTHWICK.